Oct. 17, 1944.   J. L. McGINNIS ET AL   2,360,781
BEARING PULLER
Filed Jan. 27, 1944
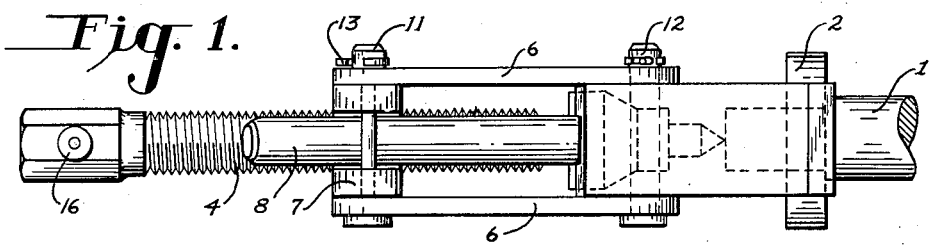
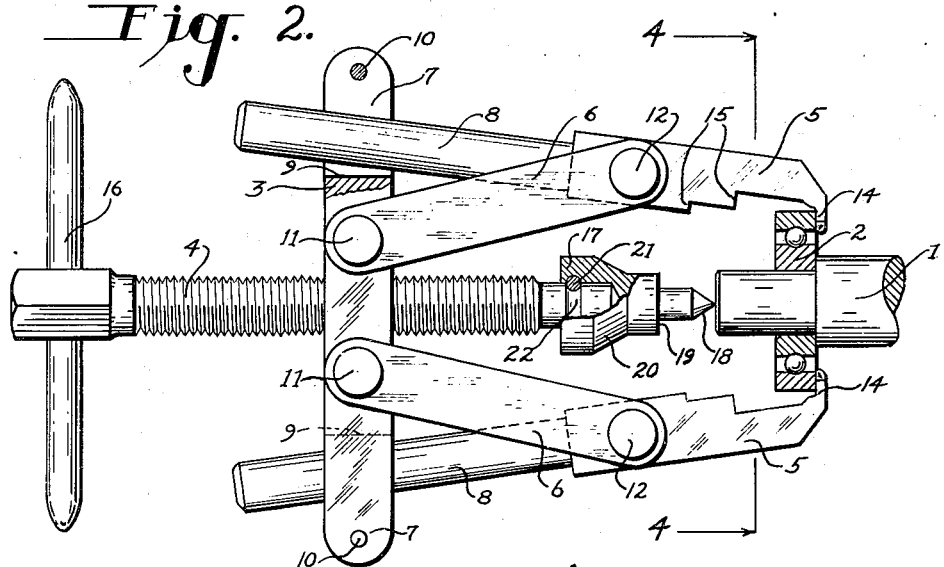
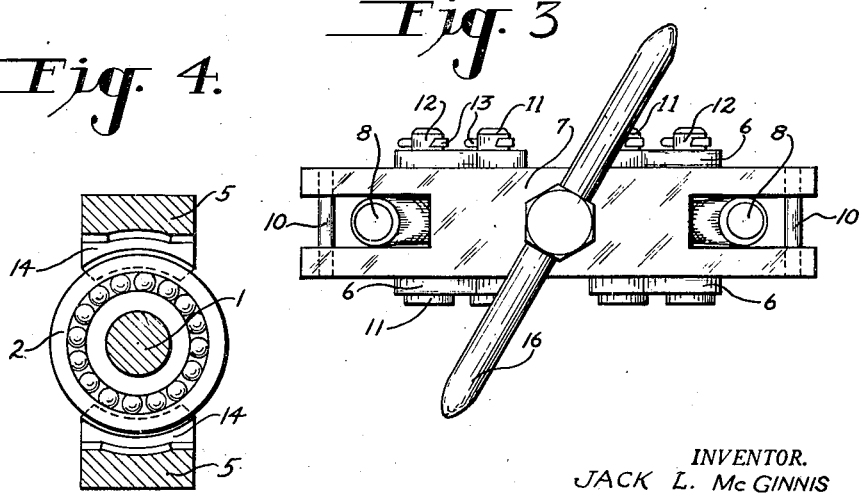
INVENTOR.
JACK L. McGINNIS
BY KENNETH A. HONROTH
*Frank A. Harmon*
ATTORNEY Patented Oct. 17, 1944

2,360,781

UNITED STATES PATENT OFFICE 2,360,781

BEARING PULLER

Jack L. McGinnis, East Cleveland, and Kenneth A. Honroth, Cleveland, Ohio, assignors, by mesne assignments, to Jack & Heintz, Inc., Cleveland, Ohio, a corporation of Ohio Application January 27, 1944, Serial No. 519,856

1 Claim. (Cl. 29—261)

This invention relates to a bearing puller for pulling ball bearing assemblies from the ends of shafts and has as its general object the provision of a novel and improved adjustable bearing puller which will accommodate bearings of a variety of sizes. This and other objects of the invention are attained in the preferred embodiment illustrated wherein:

Figure 1 is a side elevational view showing the bearing puller tightened in position for removing a ball bearing assembly from the end of a shaft;

Figure 2 is a side elevational view taken at right angles to Figure 1, with certain parts broken away;

Figure 3 is a top plan view; and

Figure 4 is a cross sectional view taken on the line 4—4 of Figure 2.

Referring to the drawing, 1 indicates a shaft having a ball bearing assembly 2 pressed thereon. The bearing puller of the present invention comprises essentially a cross bar 3, a screw 4, and a pair of jaws 5 pivotally connected with the cross bar by the links 6 in the manner shown. The center of the cross bar 3 is tapped to receive a screw 4 and has forked ends 7 receiving cylindrical extensions or shanks 8 on the jaws 5. Each forked end 7 thereby forms a slot or guide allowing considerable freedom for angular and longitudinal movements of the shank 8 between a wall portion 9 terminating at the inner end of the slot and a pin 10 bridging the outer end. The links 6 are pivotally connected with the cross bar 3 by means of pins 11 and are pivotally attached to the jaws 5 by means of pins 12, these pins being retained by means of cotter pins 13 or the like.

Each jaw 5 terminates in an arcuate finger 14 shaped to fit an intermediate size of bearing within the range of sizes to be accommodated, and the jaws are notched back as at 15 in a manner to best accommodate bearing assemblies of different lengths. One end of the screw 4 is provided with a handle 16 and the other is provided with a rotatably mounted end piece 17 having a center point 18, a shoulder 19 and a conically tapered surface 20 to fit different types of shaft ends. The end piece 17 is provided with a transverse pin 21 which is adapted to lie in an annular groove 22 in the screw 4 to retain the end piece on the screw and at the same time permit free rotation thereof.

In use, the fingers 14 are hooked behind the bearing assembly in the manner shown, and the screw 4 is tightened against the end of the shaft 1 through the end piece 17. The axis of each pivot pin 12 is thereby constrained to lie outside of the line of tension between the tip of the finger 14 and the axis of the pivot pin 11, and since the two pivot pins 11 are spaced relatively close together on the cross bar 3 any thrust exerted by the screw 4 against the end of the shaft 1 tends to pull the jaws 5 toward each other to prevent them from slipping off the bearing assembly. This is true for any size bearing assembly because the spacing of the pins 11 in the bar 3 is such that even for the smallest bearing assembly on which the device is to be used the pins 11 are closer together than the fingers 14.

As the screw 4 is tightened, the shanks 8 are brought to bear against the walls 9 to maintain a substantial angular relation between each jaw 5 and its associated links 6. This geometrical arrangement of the parts insures that as the screw 4 is tightened, the jaws 5 will grip the bearing assembly more and more securely to produce a powerful end thrust on the bearing assembly without possibility of the jaws slipping off.

Thus the present bearing puller is automatically adaptable to bearings of different sizes and to different sizes of solid and hollow shaft ends without adjustment or interchanging of parts. It is ruggedly constructed of few and easily formed parts rendering the device inexpensive to manufacture. Various changes may be made in the construction and arrangement and all such modifications are included in the invention, which is limited only by the scope of the appended claim.

We claim:

A self-adjusting bearing puller comprising a cross bar having slotted ends, a threaded screw hole in the center of said bar, a pair of pivotal connections on said cross bar on opposite sides and closely adjacent said screw hole, a pair of links attached to said cross bar at each of said pivotal connections, a jaw member pivotally attached to each of said pairs of links, arcuate jaw ends on said members adapted to grip a circular bearing or the like of a diameter greater than the distance between said pivotal connections on said cross bar, a screw engaged in said threaded hole in said cross bar, an end piece swivel mounted on an end of said screw, said end piece having a center point and flat and conical shaft end engaging surfaces for engagement with solid and hollow shafts of different sizes, a bar handle for hand manipulation on the other end of said screw for applying force through said end piece to a shaft end engaged thereby, and shanks on said jaw members passing through the slotted ends of said cross bar so as to maintain an angular relation between said jaw members and said links to effect a firm inwardly directed gripping engagement with said bearing.

JACK L. McGINNIS.
KENNETH A. HONROTH.